US004001761B2

United States Statutory Invention Registration [19]

[11] Reg. Number: H1761

[45] Published: Dec. 1, 1998

Manion et al.

[54] HYDRAULIC CIRCUIT LEAK DETECTOR AND SHUT-OFF MECHANISM

[75] Inventors: John K. Manion; John W. Holtrop, both of Ridgecrest, Calif.

[73] Assignee: The United States of America as represented by the Secretary of the Navy, Washington, D.C.

[21] Appl. No.: 730,605

[22] Filed: Oct. 7, 1996

[51] Int. Cl.[6] ..... F16K 17/00

[52] U.S. Cl. ..... 137/460

[58] Field of Search ..... 137/87.03, 87.04, 137/459, 460, 595, 486

[56] References Cited

U.S. PATENT DOCUMENTS

| | | | |
|---|---|---|---|
| 1,206,806 | 12/1916 | Borden | 137/87.04 |
| 1,339,798 | 5/1920 | Thompson | 137/87.03 |
| 3,568,705 | 3/1971 | Boyadjieff | 137/87.04 |
| 4,535,797 | 8/1985 | Rosaen | 137/87.03 |
| 4,892,114 | 1/1990 | Maroney et al. | 137/87.03 |

*Primary Examiner*—Charles Jordan
*Assistant Examiner*—Meena Chelliah
*Attorney, Agent, or Firm*—Melvin J. Sliwka; Stephen J. Church

[57] ABSTRACT

A leak detector and shut-off apparatus shuts off hydraulic fluid downstream to prevent the hazards attendant hydraulic failure such as loss of fluid and fire. A first sensor is coupled to a supply line for hydraulic fluid to produce pressure differential force $F_s$, which is representative of the flow of hydraulic fluid. A second sensor is coupled to a return line for hydraulic fluid to produce pressure differential force $F_r$ that is representative of flow of hydraulic fluid. A compensator creates representation $F_c$ of the rate of accumulation of hydraulic fluid in the hydraulic circuit downstream of the device and a safety margin. A shutoff mechanism is connected to the first and second sensors and the compensator to shut off the supply and return lines when $F_s$ is greater than the sum of $F_r$ and $F_c$. Mechanical and electrical designs shutoff or isolate downstream hydraulic actuators, branches or select components immediately when a leak is detected to prevent loss of fluid and to reduce the hazards of fire.

19 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HYDRAULIC CIRCUIT LEAK DETECTOR AND SHUT-OFF MECHANISM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Hydraulic systems are many and varied in design. Typically, they have been used to control remote mechanisms and control surfaces. Most aircraft rely on hydraulic systems to transmit forces and motion from pilot commands to control surface movements. The aircraft utilize several mechanisms to protect hydraulic systems in case of pressure loss. Most of these safeguards are responsive to loss of pressure in the closed system (i.e., loss of pumps). However, aircraft that are damaged and develop hydraulic leaks elsewhere in a hydraulic ensemble may lose one or all of the constituent hydraulic systems. The design of many contemporary hydraulic systems is such that a leak in a branch of a system may result in the complete loss of that system. This type loss, while leaving basic flight control to the backup systems, may result in reduced handling qualities and make mission completion and safe flight impossible. Additionally, any leak in a hydraulic system has the potential for causing fires that can have catastrophic results.

Reservoir level sensing has been and is relied upon to disconnect leaking hydraulic systems. Sensors located in the hydraulic reservoirs detect leaks by sensing the level of hydraulic fluid in the reservoirs. If the level in any reservoir is decreasing, the hydraulic systems are shut down one by one exclusively until the level stops decreasing. Obviously, this method takes time and shuts down entire systems. The relatively long time to isolate the problem can lead to hydraulic fire, and this technique will shut down an entire system, not only the lines that are affected.

Check valves are inserted in some hydraulic systems to guard against the hazards associated with hydraulic fluid leakage. Check valves limit flow in one direction. If upstream hydraulic pressure is lost, the items downstream of the check valve can still be pressurized from another source. The problem with this approach is that if pressure is lost downstream from the check valve, it will not close and all of the fluid may be lost or a fire might result. Isolation valves are added in some systems to afford a limited degree of protection. These valves allow components of the hydraulic system that are not being used to be shut off from the rest of the system. In aircraft, for example, isolation valves limit the load a particular system has during flight. Typically, they are restricted to the landing gear and wing fold systems. Isolation valves provide limited leakage protection. They are usually designed with a backup pump within the isolated branches that gives emergency power to the isolated system when the primary hydraulic supply system loses pressure. The major limitation of using isolation valves in this manner is that if the isolated system sustains damage and leaks, the leak will not be detected until the isolation valve is opened and the supply system begins to lose fluid. For example, the isolation valve for the landing gear and wing fold systems is not opened until the approach for landing. At this time the workload is high and precision flight is essential. Failure of a hydraulic system at this time is catastrophic.

Switching valves are relied upon to switch system pressurization to an alternate system when the primary system loses pressure. The problem with using switching valves becomes apparent from the following: if a hydraulic actuator leaks in a primary system and this defective actuator were switched to be pressurized by a backup or alternate system, this system would also leak.

Hydraulic fuse systems are used successfully only in limited areas. A hydraulic fuse functions very similarly to an electrical fuse. When an excessive flow is measured over a period of time, then the device shuts down the line. The major limitation of a hydraulic fuse is that it has relatively long response and reset times. These durations cannot be tolerated when dealing with the highly dynamic flows in the flight controls for aircraft. Usually, this device is restricted to "static" systems on the aircraft such as the wheel brakes, landing gear extension systems, and lines to pressure gauges.

Therefore, in accordance with this invention a need in the state of the art has been discovered for an apparatus that will nearly instantaneously detect leaks and in a branch, circuit, or component of a hydraulic system and immediately shut off the flow of hydraulic fluid to the affected branch, circuit, or component and leave hydraulic pressure for the rest of the elements in that system.

SUMMARY OF THE INVENTION

The present invention is directed to providing an apparatus for shutting off a hydraulic circuit. A first sensor coupled to a supply line for hydraulic fluid produces a force $F_s$ that is representative of the flow of hydraulic fluid. A second sensor coupled to a return line for hydraulic fluid produces a force $F_r$ that is representative of the flow of hydraulic fluid. A compensator creates a force $F_c$ that is representative of the rate of accumulation of hydraulic fluid in the hydraulic circuit. A shut-off mechanism is connected to the first and second sensors and the compensator to shut off the supply line and return line when $F_s$ is greater than $F_r+F_c$.

A prime objective of the invention is to provide a safety feature for hydraulic systems.

Another objective of the invention is to provide a safety feature for hydraulic systems that reduces hydraulic fluid leakage.

Another objective is to provide a mechanism that reduces the hazards associated with leaking fluid.

Still another objective of the invention is to provide a safety feature for hydraulic systems that reduces the possibility of fire.

Another objective is to provide a mechanism for a hydraulic system that immediately shuts down supply and return lines in a hydraulic circuit when leakage occurs.

Yet another objective is to provide an apparatus that immediately disconnects hydraulic equipments when leakage occurs to reduce the loss of hydraulic fluid and possibility of fire.

Another objective of the invention is to provide leakage detection and isolation within a hydraulic system to allow continued operation of that system.

These and other objectives of the invention will become more readily apparent from the ensuing specification and drawings when taken with the appended claims.

DESCRIPTION OF THE PREFERRED EMBODIMENT

Figure 1:
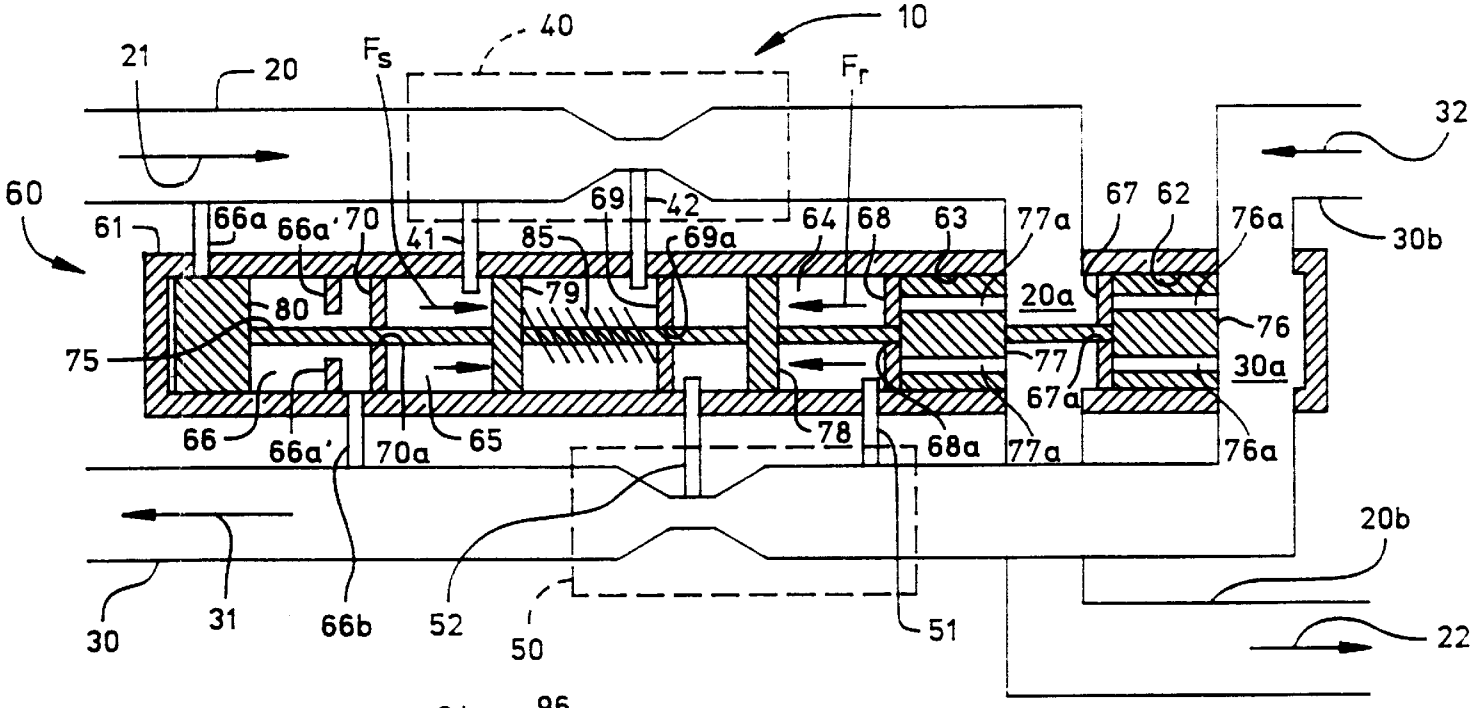
FIG. 1 sets forth a schematic cross-sectional representation of one embodiment of the hydraulic fluid leak detector and shut-off apparatus of this invention.

Referring to FIG. 1 of the drawings, hydraulic fluid leak detector and shut-off apparatus 10 of this invention is based on the principle of conservation of mass. Apparatus 10 measures the mass flow of hydraulic fluid going to and coming back from an actuator, hydraulic circuit or other hydraulic component in a hydraulic circuit, not shown in the drawings. The apparatus is designed to shut off or isolate an actuator in the event of hydraulic leakage. It does that by sensing mass flow difference that is greater than the designed imbalance of the hydraulic actuators or other mechanisms. When this difference is sensed, the apparatus immediately shuts down and cuts off flow of hydraulic fluid to the leaking circuit.

Hydraulic fluid leak detector and shut-off apparatus 10 is depicted in cross section. Apparatus 10 is shown in the open position that allows hydraulic fluid to flow uninterrupted to non-leaking hydraulic components located downstream. The term downstream refers to that portion of the hydraulic circuit that is to the right of apparatus 10 A hydraulic fluid supply line 20 and a hydraulic fluid return line 30 transmit flowing hydraulic fluid as indicated by flow arrows 21 and 31. Supply line 20 and return line 30 respectively extend through apparatus 10 in line portions 20*a* and 30*a* and downstream line portions 20*b* and 30*b*. These line portions connect hydraulic fluid as indicated by flow arrows 22 and 32 to and from a downstream actuator (not shown). Apparatus 10 is designed to shut off or close portions 20*a* and 30*a* from any hydraulic components that are downstream from the apparatus and connected to portions 20*b* and 30*b*

A pair of Bernouilli devices 40 and 50 are connected in supply line 20 and return line 30, respectively. The Bernouilli devices are identical, but could be different if desired in different design applications. Bernouilli devices 40 and 50 have ports connected to hydraulic conduits 41 and 42 and 51 and 52 extending to corresponding ports in linear piston cylinder 60.

Cylinder 60 consists of a cylinder casing 61 divided into five cylindrically-shaped compartments 62, 63, 64, 65, and 66. The compartments are separated by walls 67, 68, 69, and 70, that each have a bore 67*a*, 68*a*, 69*a*, and 70*a*, respectively. The bores are aligned with each another and are sized to slidably accommodate an elongate shaft 75 in a sealed relationship. An appropriate sealing structure, such as O-rings, sealing rings, sealing packing, sealing compounds, etc. can be included between bores 67*a*, 68*a*, 69*a*, and 70*a* and shaft 75, as will be apparent to one skilled in the art. Shaft 75 is positioned to extend through all of the bores. Shaft 75 is affixed to valve-pistons 76 and 77 in compartments 62 and 63, to pressure pistons 78 and 79 in compartments 64 and 65, and to shut-and-lock mechanism piston 80 in compartment 66. The circumferential outer surface of each piston slidably adapts to the cylindrical inner surface of the five compartments in a sealed relationship. An appropriate sealing structure, such as O-rings, sealing rings, sealing packing, sealing compounds, etc. can be included between pistons 76, 77, 78, 79, and 80 and the inner walls of compartments 62, 63, 64, 65, as will be apparent to one skilled in the art.

Shaft 75 is biased toward an open position by pre-compressed spring 85 in compartment 65 which also contains piston 79. The pre-compressed spring functions as a compensator that exerts a compensating force $F_c$ between piston 79 and wall 69. This force is transmitted to valve-piston 77 causing it to rest against wall 68 keeping portions 20*a* and 30*a* open. Compensation force $F_c$ is representative of the rate of accumulation of mass of hydraulic fluid (plus a safety margin) in an actuator downstream from linear piston cylinder 60. Consequently, when the actuator downstream becomes unbalanced, pre-compressed spring 85 will resist circuit shutoff up to a designed mass flow imbalance of the actuator plus a safety margin.

Figure 2:
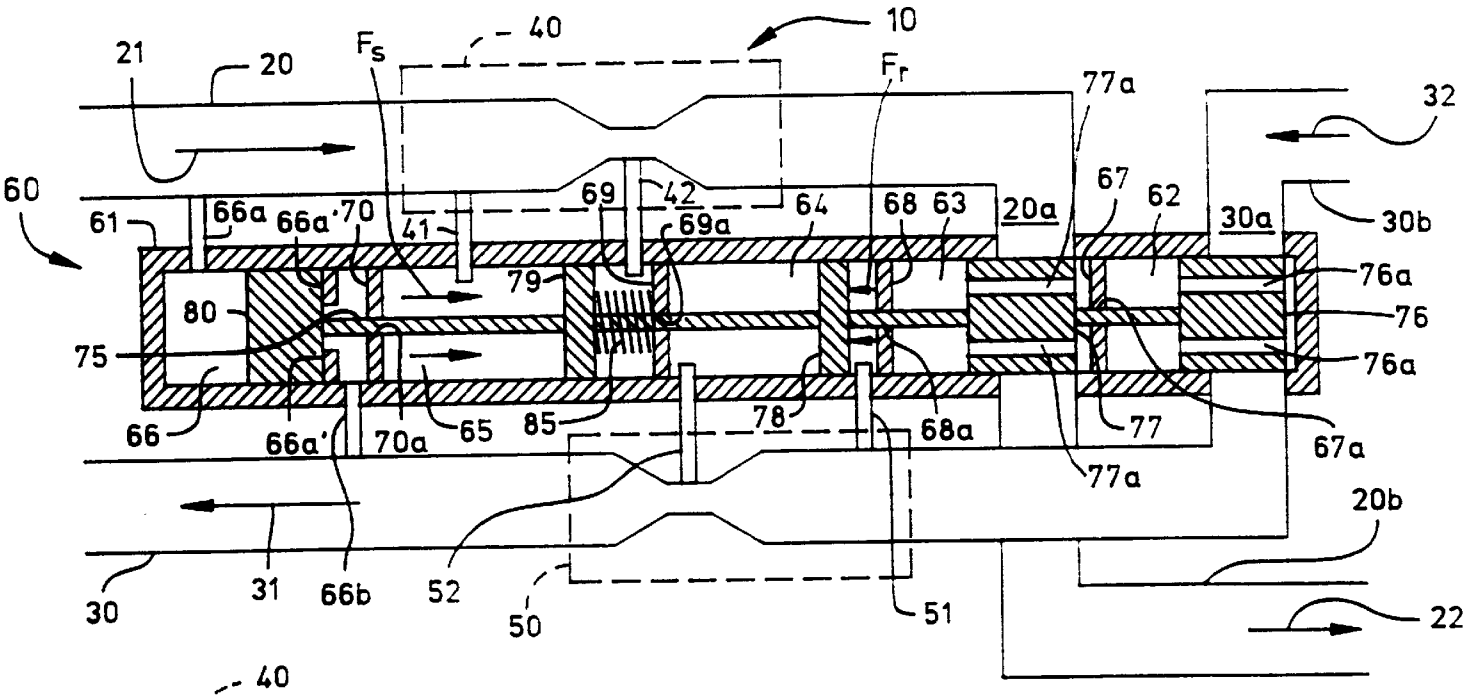
FIG. 2 shows the apparatus of FIG. 1 in the shut-off position.
Figure 4:
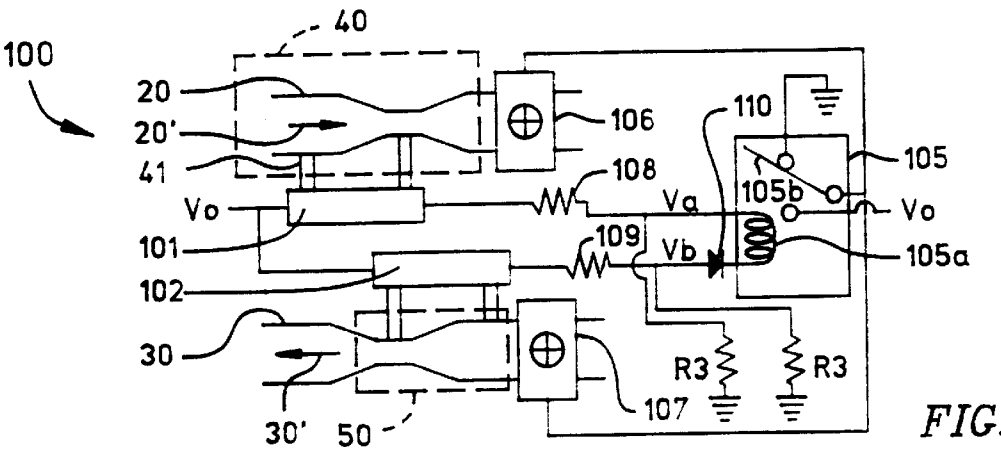
FIG. 4 depicts another embodiment of the invention employing some electrical components in the hydraulic fluid leak detector and shut-off apparatus of this invention.

Piston 80 is interconnected to shaft 75 and functions as a shut-and-lock mechanism. Conduits 66*a* and 66*b* connect compartment 66 to supply line 20 and return line 30, respectively. A leak downstream of arrangement 60 will cause shaft 75 to move in the downstream direction, in this case to the right of the drawing. This will displace piston 80 and open conduit 66*a* to the supply line pressure. This will cause a pressure difference across piston 80 that will force valve-pistons 76 and 77 to move to the right and close return line 30 and supply line 20 at portions 20*a* and 30*a*, respectively, see FIG. 2. Since compartments 62 and 63 are filled with hydraulic fluid, valve-pistons 76 and 77 are respectively provided with ducts 76*a* and 77*a* to allow the valve-pistons to be displaced in their compartments. Valve-pistons 76 and 77 will remain closed until supply pressure within line 20 is shut off.

Referring again to FIGS. 1 and 2, in operation, linear piston cylinder 60 effectively shuts off hydraulic fluid to and from a downstream actuator or other hydraulic device. Supply line 20 transmits hydraulic fluid, as represented by the arrow 21 from a remote pump, not shown, through Bernouilli device 40, into compartment 65, through portion 20*a*, and through portion 20*b* of supply line as represented by the flow arrow 22. As the hydraulic fluid passes through Bernouilli device 40, the flow of hydraulic fluid creates a pressure differential $P_S$ between conduits 41 and 42 based on Bernouilli's Principle. Pressure differential $P_s$ is transmitted via conduits 41 and 42 to cylinder compartment 65 which contains piston 79. $P_s$ is converted to force $F_s$ on piston 79 by the relationship that force equals pressure times area. This force is transmitted to the piston in the direction shown in FIGS. 1 and 2.

Simultaneously, return line 30 is transmitting returning hydraulic fluid coming from the actuator. Return line 30*b* transmits hydraulic fluid, as represented by the arrow 32 from the actuator, not shown, through portion 30*a*, through Bernouilli device 50, into compartment 64, and through return line 30 as represented by the flow arrow 31. As the hydraulic fluid passes through Bernouilli device 50, the flow of hydraulic fluid creates a pressure differential $P_r$ between conduits 51 and 52 based on Bernouilli's Principle. Pressure differential $P_r$ is transmitted via conduits 51 and 52 to cylinder compartment 64 that contains piston 78. $P_r$ is converted to a force $F_r$ on piston 78 by the relationship that force equals pressure times area. As shown in the drawings, force $F_r$ is opposite in direction to force $F_s$ that is exerted against piston 79.

Differential pressures $P_s$ and $P_r$ and consequent forces $F_s$ and $F_r$ exerted against pistons 79 and 78 are generated according to Bernouilli's Principle and the conservation of mass. These forces are direct functions of the rate of flow of hydraulic fluid or mass flow through the supply and return lines, respectively. If the Bernouilli devices are identical and no mass accumulates in the actuator, the magnitudes of $P_r$ ($F_r$) and $P_s$ ($F_s$) will be equal. If, however, there is some accumulation of mass of hydraulic fluid in the actuator, $P_s$ will not equal $P_r$ and the differential forces will vary depending on the stroke of the actuator. If the stroke of the actuator causes the mass flow of hydraulic fluid through supply line 20 to be greater than the mass flow of hydraulic fluid of return line 30, then $P_s$ ($F_s$) will be greater than $P_r$ ($F_r$). However, pre-compressed spring 85 will exert its compensating force $F_c$ and prevent shaft 75 from moving as long as the mass flow of hydraulic fluid is within the design limits of the actuator. If the actuator is on a stroke that gives up its accumulated mass of hydraulic fluid, $P_r$ will be greater than $P_s$. However, this will not result in any movement in the shaft 75 because piston 77 is resting against wall 68 that separates compartments 63 and 64.

If a leak occurs in portion 20*b* of the supply line downstream of apparatus 10*b,* considerably more hydraulic fluid flows through Bernouilli device 40 than through Bernouilli device 50. Based on Bernouilli's Principle, therefore, $P_s$ and thus force $F_s$ will be greater than force $F_r$ created by $P_r$. Consequently, pre-compressed spring 85 and pistons 76, 77, 78, 79, and 80 affixed to shaft 75 will begin to move in the right. As piston 80 moves to the right, supply line pressure is fed to one side of the piston via interconnect 66*a* and displaces piston 80 until it rests against stops 66*a*' in compartment 66, see FIG. 2. This motion of piston 80 to the right displaces shaft 75 and valve-pistons 76 and 77 to shut portions 20*a* and 30*a* of the supply and return lines. This action shuts off all hydraulic fluid flow downstream of apparatus 10.

If there is a leak in portion 30*b* of the return line downstream of apparatus 10, fluid flows through Bernouilli device 40. However, very little, if any, fluid will flow through Bernouilli device 50. This causes the same displacement of shaft 75 and its connected structures and results in shutoff in portions 20*a* and 30*a* of the supply and return lines as described in the previous paragraph with respect to a supply line leak.

Note that apparatus 10 is designed to detect leaks downstream of its location. Any leaks upstream will not be detected. Apparatus 10 is designed to be located at the beginning of branches in a hydraulic system, or before any other particular element of component in a hydraulic system that should be isolated when it leaks.

Figure 3:
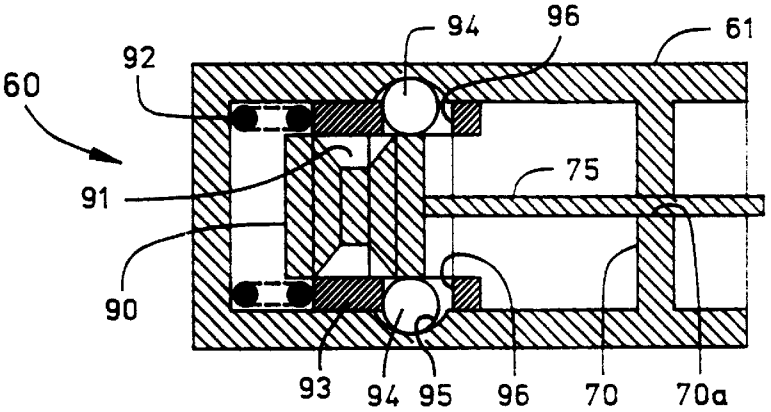
FIG. 3 depicts an alternate design for a shut-and-lock mechanism.

FIG. 3 shows an alternate design for piston 80. Piston 90 is shown in an alternate design of a shut-and-lock mechanism and it is provided with a circumferential groove 91. A pre-compressed spring 92 is held between an inner surface of casing 61 and an inner cylinder 93. The inner cylinder is held in place by ball bearings 94 wedged into a pair of cuts 95 provided in casing 61. As piston 80 moves in the downstream direction due to failure of the hydraulic actuator, for example, ball bearings 94 are forced into openings 96 provided in inner cylinder 93 and into groove 91. This frees inner cylinder 93 from casing 61 and attaches it to piston 90. The force exerted by pre-compressed spring 92 against inner cylinder 93 drives piston 90 and shaft 75 to the far right which shuts off portions 20*a* and 30*a* by valve-pistons 77 and 76, respectively. All hydraulic fluid flow downstream of apparatus 10 is shut off. Note that this design will keep valve-pistons 76 and 77 shut until the apparatus is reset by pushing piston 90 back to its original position.

Normally, the forces on shaft 75 are balanced and the valve-pistons 76 and 77 remain open. If, however, a leak occurs downstream of apparatus 10 in either supply line 20 or return line 21, the forces on shaft 75 move piston 90 to a position in which spring 92 takes over and shuts down the hydraulic system downstream of the device.

Although mechanical embodiments have been discussed so far, electrical embodiments are also within the scope of this inventive concept. FIG. 3 depicts electrical apparatus 100. Pistons 78 and 79 of apparatus 10 are replaced with pressure transducers 101 and 102. In this description, substantially identical components of the previous embodiment, will retain the same reference characters. Pressure transducers 101 and 102 are simple resistance-type diaphragm transducers that may be designed to measure pressures estimated on the order of 10 psi to 6000 psi accurately. A simple relay 105 replaces pistons 80 or 90 in the mechanical embodiment, and valve-pistons 76 and 77 are replaced by off-the-shelf solenoid valves 106 and 107. The function of biasing spring 85 is replaced by the effect of resistors 108 and 109. One benefit of the electrical embodiment is that the pressure and return lines do not have to be coincident.

Referring again to FIG. 3, the principle relied upon to generate the pressure differential is the same as the mechanical embodiments described above. The difference is that the pressure differential is sensed electronically by the coaction of resistance-type diaphragm pressure transducers 101 and 102. Voltage $_o$ is applied to one end of the transducers and a current flows through the resistors in the transducers, through the balancing resistors 108 and 109, through resistors $R_3$, and to ground. Resistors 108 and 109 function to provide mass flow tolerance or compensation similar to the function of pre-compressed spring 85 in the mechanical devices. Resistors 108 and 109 balance out voltages $V_a$ and $V_b$ for a predetermined mass flow tolerance. A diode 110 is included to prevent any displacement of shaft 75 when $V_b$ is less than $V_a$. This provides an equivalency to the condition occurring in the embodiment of FIG. 1 when $P_r$ is greater than $P_s$ and piston 77 rests against wall 68. Relay 105 has inductor coil 105*a* and switch 105*b* to provide essentially the same function as piston mechanisms 80 and 90.

If the pressure differential differences between $P_s$ and $P_r$ are zero, or normal, then the voltages at relay 105 are equal or $V_b$ is less than $V_a$. No current flows through the relay's inductor and the circuit to solenoid valves 106 and 107 remain open. Once, however, $P_s$ is greater than $P_r$ plus tolerance or compensation preset by the magnitudes of resistors 108 and 109, then $V_a$ is less than $V_b$. This condition sets up a current through inductor coil 105*a* of relay 105. The current flow generates a magnetic field that attracts switch 105*b* in relay 105 and closes the circuit to solenoid valves 106 and 107. Immediately, valves 106 and 107 close the downstream leak.

The specific mechanical and electrical embodiments described hereinabove are intended to be illustrative of this inventive concept and are not to be construed as limiting. It is to be understood that many configurations, arrangement of constituents and modifications of the constituents could be made by one skilled in the art without departing from the scope of this invention. It is well within the purview of one skilled in the art to select suitable noncorrosive or corrosion resistant materials having sufficient strength.

Obviously, many modifications and variations of the present invention are possible in light of the above teachings. It is therefore to be understood that within the scope of the appended claims the invention may be practiced otherwise than as specifically claimed.

We claim:

1. An apparatus for shutting off a hydraulic circuit comprising:

a first sensor coupled to a hydraulic fluid supply line to produce force $F_s$ representative of flow of hydraulic fluid;

a second sensor coupled to a hydraulic fluid return line to produce force $F_r$ representative of flow of hydraulic fluid;

a compensator to create force $F_c$ representative of the rate of accumulation of hydraulic fluid in said hydraulic circuit; and a shutoff mechanism connected to said first and second sensors and said compensator.

2. An apparatus according to claim 1 in which said forces $F_s$ and $F_r$ are representative of pressure differential forces $P_s$ and $P_r$, and consequently, the mass flow difference between supply and return, respectively.

3. An apparatus according to claim 2 in which said shutoff mechanism immediately shuts off said supply line when $F_s$ is greater than the sum of $F_r$ and $F_c$.

4. An apparatus according to claim 3 in which said shutoff mechanism immediately shuts off said return line when $F_S$ is greater than the sum of $F_r$ and $F_c$.

5. An apparatus according to claim 4 in which said first and second sensors include Bernouilli devices providing pressure differential forces $P_s$ and $P_r$.

6. An apparatus according to claim 5 in which said compensator includes a pre-compressed spring.

7. An apparatus according to claim 6 in which said shutoff mechanism comprises:

a housing having a plurality of cylindrical compartments separated by walls each having a bore aligned with each another;

a shaft extending through all of the bores to permit reciprocal motion therethrough; and at least one piston affixed to said shaft in each said compartment.

8. An apparatus according to claim 7 in which said pre-compressed spring is in one of said compartments to displace said shaft in one direction.

9. An apparatus according to claim 8 in which first and second ones of said compartments respectively contain a portion of said supply line and said return line, and first and second pistons are in said first and second compartments, respectively.

10. An apparatus according to claim 9 in which said first and second pistons function as valves to close said supply and return lines when $F_s$ is greater than the sum of $F_r$ and $F_c$.

11. An apparatus according to claim 10 in which said $F_r$ pushes against a third piston in a third one of said compartments to displace it in said one direction, and $F_s$ pushes against a fourth piston in a fourth one of said compartments to displace it in the opposite direction.

12. An apparatus according to claim 11 in which a fifth one of said compartments contains a circumferentially grooved piston, a sleeve having openings on said recessed piston, a spring pre-compressed between said sleeve and said housing, and a series of ball bearings carried in recesses in said housing to extend through said openings.

13. An apparatus according to claim 10 in which a fifth one of said compartments has conduits connected to said supply and return lines and contains a fifth piston.

14. An apparatus according to claim 12 in which said fifth piston closes said conduit to said supply line when $F_s$ is not greater than the sum of $F_r$ and $F_c$ and opens said conduit to said supply line when $F_s$ is greater than the sum of $F_r$ and $F_c$.

15. An apparatus according to claim 1 in which said first and second sensors each include a Bernouilli device and a pressure transducer to produce supply signal $V_a$ representative of said force $F_s$ and return signal $V_b$ representative of said force $F_r$, respectively, said compensator includes an impedance element coupled to each said pressure transducer to produce a voltage drop representative of rate of accumulation of hydraulic fluid in said hydraulic circuit, and said shutoff mechanism includes a relay coupled to a solenoid valve in said supply line and in said return line.

16.An apparatus according to claim 15 in which said relay is actuated to shut said solenoid valves and close said supply and return lines when $V_a$ varies from $V_b$ by a set amount.

17. An apparatus according to claim 16 in which mass flow is converted to voltages $V_a$ and $V_b$.

18. A leak detector and shutoff apparatus comprising:

means connected to a hydraulic fluid supply line for sensing pressure differential force $P_s$ representative of flow of hydraulic fluid;

means connected to a hydraulic fluid return line for sensing a pressure differential $P_r$ representative of flow of hydraulic fluid;

means for compensating for rate of accumulation of hydraulic fluid in an interconnected hydraulic element to create a representative pressure force $F_c$; and means connected to said $P_s$ and $P_r$ sensing means for shutting off said supply and return lines.

19. A method for shutting off a hydraulic circuit comprising:

sensing a pressure differential $P_s$ representative of flow rate of hydraulic fluid in a supply line to create force $F_s$;

sensing a pressure differential $P_r$ representative of flow rate of hydraulic fluid in a return line to create force $F_r$;

compensating for rate of accumulation of hydraulic fluid in an interconnected hydraulic element with a force $F_c$; and shutting off said supply and return lines when $F_s$ is greater than the sum of $F_r$ and $F_c$.

* * * * *